(12) United States Patent
Sattelberger et al.

(10) Patent No.: US 9,358,675 B2
(45) Date of Patent: Jun. 7, 2016

(54) LUBRICATING PUMP WITH DOUBLE-ACTING DRIVE PISTON

(75) Inventors: Paul Sattelberger, Reilingen (DE); Werner Saam, Oberhausen-Rheinhausen (DE)

(73) Assignee: Willy Vogel AG, Berlin (DE)

( * ) Notice: Subject to any disclaimer, the term of this patent is extended or adjusted under 35 U.S.C. 154(b) by 1070 days.

(21) Appl. No.: 12/303,105

(22) PCT Filed: Jun. 1, 2007

(86) PCT No.: PCT/EP2007/004866
§ 371 (c)(1),
(2), (4) Date: Aug. 26, 2009

(87) PCT Pub. No.: WO2007/140935
PCT Pub. Date: Dec. 13, 2007

(65) Prior Publication Data
US 2009/0308692 A1    Dec. 17, 2009

(30) Foreign Application Priority Data
Jun. 2, 2006 (DE) .......... 10 2006 026 274

(51) Int. Cl.
*F16N 13/16* (2006.01)
*B25D 17/26* (2006.01)
(Continued)

(52) U.S. Cl.
CPC .......... *B25D 17/26* (2013.01); *F04B 9/105* (2013.01); *F04B 9/113* (2013.01); *F16N 13/18* (2013.01); *F16N 13/22* (2013.01); *F16N 25/02* (2013.01)

(58) Field of Classification Search
USPC .............. 184/6.14, 6.28, 26, 33, 29
See application file for complete search history.

(56) References Cited

U.S. PATENT DOCUMENTS 1,963,783 A * 6/1934 Fox .................... 222/254
2,844,286 A * 7/1958 Lipinski .................. 222/250
(Continued)

FOREIGN PATENT DOCUMENTS

AU    52768/73    9/1974
DE    1 528 573    7/1970
(Continued)

OTHER PUBLICATIONS

International Search Report, Preliminary Report on Patentability, and Written Opinion for Interational Application No. PCT/EP2007/004866, filed Jun. 1, 2007, 8 pages.
(Continued)

*Primary Examiner* — William E Dondero
*Assistant Examiner* — Mark K Buse
(74) *Attorney, Agent, or Firm* — Fish & Richardson P.C.

(57) ABSTRACT

The invention relates to an automatic lubricating pump (1) for a machine having a hydraulically actuated striking tool (4), such as a hydraulic hammer for example. The lubricating pump (1) is designed such that it can be connected to a pressure line (P) of the hydraulic circuit (2). The lubricating pump (1) has a drive piston (8), designed such that it can be driven by the hydraulic circuit, and a feed piston, connected to the drive piston in a motion-transmitting manner, of a feed pump (9), by means of which lubricant is fed to a lubricating point. The service life of the lubricating pump can be prolonged compared with conventional pumps if the drive piston (8) is designed to be double-acting with two drive chambers (8c, 8d) and a hydraulically operable changeover member (16) is provided which can be engaged in the hydraulic circuit and by means of which the drive chambers (8c, 8d) can be alternately and automatically connected to the pressure line (8) during operation.

19 Claims, 4 Drawing Sheets

(51) Int. Cl.
*F04B 9/105* (2006.01)
*F04B 9/113* (2006.01)
*F16N 13/18* (2006.01)
*F16N 13/22* (2006.01)
*F16N 25/02* (2006.01)

(56) References Cited

U.S. PATENT DOCUMENTS

| | | | |
|---|---|---|---|
| 3,972,387 A * | 8/1976 | Braun | 184/28 |
| 4,044,924 A | 8/1977 | Saretzky | |
| 4,180,090 A * | 12/1979 | Bemba | 137/106 |
| 4,609,073 A | 9/1986 | Knaebel | |
| 4,646,854 A | 3/1987 | Arndt et al. | |
| 4,895,497 A * | 1/1990 | Schlinkheider | 417/403 |
| 4,921,072 A | 5/1990 | Divisi | |
| 5,060,761 A * | 10/1991 | Arndt et al. | 184/6.14 |
| 6,145,625 A * | 11/2000 | Prokop et al. | 184/27.1 |
| 6,296,078 B1 * | 10/2001 | Liu | 184/29 |
| 6,631,787 B2 * | 10/2003 | Conley et al. | 184/6.14 |
| 6,929,098 B2 | 8/2005 | Ilmarinen et al. | |
| 6,959,967 B1 | 11/2005 | Prokop et al. | |
| 7,621,702 B2 * | 11/2009 | Ende et al. | 408/61 |
| 7,694,748 B2 * | 4/2010 | Oksman | 173/77 |
| 2007/0187181 A1 | 8/2007 | Brendel | |
| 2009/0053078 A1 * | 2/2009 | Keuper et al. | 417/309 |

FOREIGN PATENT DOCUMENTS

| | | |
|---|---|---|
| DE | 24 37 473 | 7/1975 |
| DE | 29 17 863 | 11/1980 |
| DE | 34 16 041 | 10/1985 |
| DE | 34 43 542 | 6/1986 |
| DE | 39 39 785 | 6/1991 |
| DE | 197 04 958 | 8/1998 |
| DE | 198 03 449 | 8/1999 |
| DE | 201 18 920 | 4/2002 |
| DE | 101 18 284 | 5/2002 |
| DE | 202 06 050 | 8/2002 |
| DE | 202004008752 | 10/2004 |
| EP | 0 212 369 | 3/1987 |
| EP | 0 244 182 | 11/1987 |
| EP | 0 313 821 | 5/1989 |
| EP | 1 112 820 | 7/2001 |
| EP | 1 321 245 | 6/2003 |
| EP | 1 355 104 | 10/2003 |
| EP | 1 626 225 | 2/2006 |
| EP | 1 643 123 | 4/2006 |
| FR | 2 188 785 | 1/1974 |
| JP | 2003-200361 | 7/2003 |
| WO | WO 87/06653 | 11/1987 |

OTHER PUBLICATIONS

Uncertified machine translation of specification and abstract of German Patent Publication No. DE10118284; downloaded from http://worldwide.espacenet.com/; 6 pages.

* cited by examiner

LUBRICATING PUMP WITH DOUBLE-ACTING DRIVE PISTON

CROSS-REFERENCE TO RELATED APPLICATIONS

This application is a national stage application under 35 USC 371 of, and claims priority to, the International Patent Application No. PCT/EP2007/004866, filed Jun. 1, 2007, which claims benefit of German Patent Application No. 10 2006 026 274.3, filed Jun. 2, 2006. The disclosures of the prior applications are considered part of (and are incorporated by reference in) the disclosure of this application.

TECHNICAL FIELD

The invention relates to an automatic lubricating pump which is designed for connection to a pressure line of a hydraulic circuit with a repeatedly increasing or a constant hydraulic pressure of a machine, such as a construction machine with a hydraulic hammer, with a drive piston shaped to be driven by the hydraulic circuit, and a feed piston, which is connected in a motion-transmitting manner to the drive piston and which borders a feed chamber which can be filled with lubricant and which is connected to at least one lubricant outlet of the automatic lubricating pump.

The invention also relates to a method for lubricating at least one lubricating point of machines having their own hydraulic circuit, such as construction machines, wherein a drive piston is moved by a repeatedly increasing or a constant hydraulic pressure in a pressure line of the hydraulic circuit, and the motion of the drive piston is transferred to a feed or delivery piston coupled to the drive piston, said feed piston conveying the lubricant in the direction of the at least one lubricating point.

BACKGROUND

From the state of the art a range of differently designed automatic lubricating pumps are known which are employed for the lubrication of tools on a construction machine, in particular for hydraulic striking tools such as hydraulic hammers, and are driven automatically, i.e. from the hydraulic circuit on the construction machine without their own power source. The hydraulic circuits for striking tools are characterised in that the hydraulic pressure repeatedly increases; this is achieved by interposing a periodically actuated changeover valve. The change between the rise in pressure and the drop in pressure produces the impact movement of the striking tool. The lubrication of striking tools of this nature, such as described for example in DE-A-34 43 542 or DE-A-198 03 449, is problematical, because, due to the high forces acting on the striking tool and the usually dusty environment, lubricants with a high proportion of solids and a high lubrication pressure must be used.

In DE-A-39 39 785 these problems with the lubrication are solved in that the feed pressure with which the lubricating grease is passed to a lubricating point is normally generated by the high operating pressure of the hydraulic circuit. If the hydraulic pressure is not applied in the operational breaks, the feed piston is moved into an initial position by a return spring. Due to the highly viscous lubricating grease, the returning force of the return spring is not sufficient for the feed piston to automatically draw in lubricating grease. Therefore, the lubricant reservoir has a compression spring in order to move the lubricating grease under pressure to the feed piston and to fill a feed chamber. With the application of the operating pressure the feed piston executes a single feed movement. With a longer operating period, to avoid the feed piston only operating once, a battery operated control device can be provided, which, starting in each case with the initial operation of the striking mechanism, opens a shut-off valve at successive times with a selectable time interval to apply the operating pressure a number of times to the feed piston and to correspondingly execute the feed movement many times.

DE-A-197 04 958 relates to a suction and pump unit which can automatically evacuate the air inclusions even with the use of lubricating grease with a high or very high solids content. To achieve this, the volume swept by a feed piston in operation is divided between a feed section which is connected to the lubricating point by a feed line closed by a non-return valve and a compression section into which a vent line opens. Due to their compressibility, air inclusions in the lubricant lead to the feed piston moving over the feed section without the non-return valve in the feed line opening. When the feed piston sweeps the compression section, the lubricant with the air inclusions is forced through the vent hole. As with the lubricating pump in DE-A-39 39 785, the feed piston in DE-A-197 04 958 also operates with a return spring.

The disadvantage of lubricating pumps as described in DE-A-39 39 785 and DE-A-197 04 958 is that the feed pistons execute one full feed stroke each time the operating pressure is applied. Therefore special measures must be taken to operate the feed piston a number of times during the continuous operation of the striking tool over a longer time period. One such measure is the control device of DE-A-39 39 785 described above. This is however a cost-intensive solution which is prone to faults.

A further measure of ensuring continuous lubrication during the complete operating period of the striking tool is described in DE-U-20 118 920. According to this solution, a progressive metering valve, which periodically extends and withdraws an actuating piston, is included in the bypass line of the hydraulic circuit. A flange shoulder of a freewheeling clutch attached to a shaft is pressed against the actuating piston under the force of a spring. The flange shoulder follows the movement of the actuating piston while the freewheeling clutch prevents reversal of the shaft when the actuating piston is withdrawn. In this way the shaft is moved gradually in a rotational direction and a cam located on the shaft is turned, driving a pump element.

According to the further development of DE-U-202 06 050, the progressive metering valve of DE-U-20 118 920 can be dispensed with if the flange shoulder is directly actuated by the striking mechanism via an actuating arm.

In EP-A-1 112 820 the freewheeling clutch is driven by a weight which moves with the vibrating motion of the striking tool.

In EP-A-1 626 225 a lubricant pump is shown for a vehicle or a constructional, agricultural or industrial machine. The lubricant pump switches automatically from a feed mode, in which the feed piston conveys lubricant to a lubricating point, into a filling mode when a lubricant receptacle is filled under pressure. For the changeover a changeover piston is used on the pressure-fluid side and one is also used on the lubricant side.

With the automatic lubrication device of EP-A-1 643 123 a hydraulic motor is used which drives a reciprocating pump via a cam.

Finally, reference is also made to DE-U-20 2004 008 752, according to which a differential piston arrangement can be used to convert the high hydraulic pressure into a feed pressure, suitable for lubrication.

It can be seen from the state of the art that it has only been possible to obtain an automatic, continuous feed of lubricant during the operation of the striking tool with a high level of constructional complexity. In addition, previous solutions have consumable parts, for example in the form of springs and freewheeling clutches, which can easily fail in continuous operation and limit the service life of the lubricant pump or require short servicing intervals.

SUMMARY

The object of the invention is therefore to improve automatic lubricating pumps for use in hydraulic striking tools such that continuous lubrication during the operation of the striking tool and at the same time a high service life for the lubricating pump can be ensured.

This object is resolved according to the invention for a lubricating pump of the type mentioned in the introduction in that the drive piston is designed to be double-acting with two drive chambers, and in that a changeover member is provided which can be engaged, connected or switched into the hydraulic circuit and can be actuated by the hydraulic pressure, by means of which the drive chambers can be alternately connected to the pressure line in operation.

For the method mentioned in the introduction this object is resolved according to the invention in that two drive chambers of the drive piston are connected alternately to the pressure line and the drive piston executes a to-and-fro movement.

Through this solution the wear compared to the above mentioned lubricating pumps is substantially reduced, because no mechanically susceptible components such as return springs or freewheeling clutches are used for the feed piston. The to-and-fro movement of the drive piston is basically ensured by its design as a double-acting piston and by the alternate application of pressure in the drive chambers of the drive piston by the changeover member. Compared to known mechanical solutions from the state of the art, the use of a hydraulic changeover member, which operates automatically and hydraulically, ensures a long service life due to the comparatively low wear.

The solution according to the invention can be further improved through further measures in each case, wherein the individual measures can be combined together as required.

Thus for example, in an advantageous embodiment as a changeover member a feeder or progressive metering valve with at least two outputs is used, which in each case are assigned to a drive chamber of the drive piston. Feeders or progressive metering valves are for example known from DE-C-34 16 041, EP-A-31 38 21, DE-A-29 17 863 and DE-B-24 37 473.

In a further embodiment the drive piston can be formed by a control piston of the progressive metering valve so that a more compact design is produced. The control piston used as the drive piston can be formed larger compared to the control piston in order to transfer larger changeover forces to the feed piston.

Furthermore, for the operation of the feeder or the progressive metering valve at least two connection lines, which can be alternately connected to the pressure line of the hydraulic circuit, can be routed to the drive chambers of the drive piston. If the feeder has other outputs, then they preferably open into a return line in the hydraulic circuit. Between the connection lines of the changeover member and the drive chambers preferably at least one hydraulically actuated changeover valve can be connected which in a first operating position connects the pressure line to one drive chamber and the return line to the other drive chamber and in a second operating position connects the pressure line to the other drive chamber and the return line to the first drive chamber.

In a further embodiment of the feeder several automatic changeover valves, capable of hydraulic actuation, can be provided. The changeover valves have control lines which in each case at one end open out into a connection to the pressure line and at the other end in drive chambers of a changeover valve.

The outlets of the progressive metering valve are routed outside of the changeover member and in the connected state open out for example into a connection on a preferably unpressurised or pressure-reduced return line in the hydraulic circuit. Depending on the operating position of a changeover valve, the pressure application on a control line leads to a change in the operating position of another changeover valve. The at least one changeover valve can be formed as a hydraulically actuated multiple way valve, in particular as a plunger valve with a control piston. Preferably, the feeder or the progressive metering valve provided as changeover member in the automatic lubricating pump has at least three control pistons in order to ensure adequate operating reliability.

In a further embodiment the progressive metering valve can have at least one pressure relief valve with a certain minimum switching pressure. The pressure relief valve opens when the hydraulic pressure exceeds the minimum switching pressure. This takes place, in particular with striking tools once in an operating cycle of the striking tool, when the hydraulic pressure is increased by a periodically actuated shuttle valve in the hydraulic circuit of the machine in order to drive the striking tools. The pressure relief valve can in particular be arranged in the control lines of at least one changeover valve.

Instead of progressive metering valves other differently formed changeover members can be used which connect the drive chambers of the drive piston alternately and automatically to the pressure line of the hydraulic circuit.

For example, in a further embodiment two pressure relief valves can be used. In one embodiment the pressure relief valves can be arranged in each case in a bypass line to the switching lines opening into the drive chambers. The bypass lines serve as pilot lines for the changeover valves. This arrangement can be used instead of a progressive metering valve, but is less advantageous due to the use of valves with spring pretensioning of the components.

The to-and-fro movement of the double-acting drive piston leads advantageously to a to-and-fro movement of the feed piston with which it can automatically draw lubricant out of a reserve of lubricant and pressurisation of the reserve of lubricant using spring systems susceptible to wear is no longer needed. In particular the drive piston and the feed piston can, for example, be coupled together mechanically in a fixed manner by a piston rod.

In order to change the amount of lubricant per unit time which is discharged by the feed piston to the at least one lubricating point, the volume flow of the hydraulic circuit can be changed in an embodiment of the invention according to the method. In the automatic lubricating pump this can be realised, for example, by arranging an adjustable throttle in the hydraulic circuit. The throttle can be connected in a return line of the changeover member, i.e. in series with the changeover member, or in a bypass line, which runs parallel to the changeover member. Of course, one or more throttles can be used, of which one is arranged in the return line and the others in the bypass line, which is however more cost-intensive. This measure enables the lubricant discharge to be changed in a constructively simple manner without complicated construction measures being required in the region of the feed piston.

The lubricating pump can furthermore have a lubricant container which accommodates the reserve of lubricant. The lubricant container is embodied as a repeatedly exchangeable cartridge. With more lengthy periods of operation cost-intensive filling of the lubricant container is unnecessary, because only the cartridge needs to be changed when the reserve of lubricant has been exhausted.

The reserve of lubricant can be connected through a suction pipe to the feed chamber, wherein preferably the feed chamber is arranged below the reserve of lubricant in the direction of the gravitational force, so that the gravitational force supports the further flow of lubricant into the feed chamber. A return flow of lubricant out of the feed chamber into the reserve of lubricant when pressure is applied to the feed chamber can be avoided if, according to a further advantageous embodiment, a non-return valve is positioned in the suction line between the feed chamber and the reserve of lubricant.

Soiling of the automatic lubricating pump can be prevented by a filter device in the pressure line in front of the changeover member. An orifice device in the pressure line advantageously limits the maximum volume flow through the changeover member.

In a further advantageous embodiment a bypass line, which can be constricted or closed and which is routed from the pressure line to the return line through a pump set, can be provided for the changeover member. The pump set is preferably a solid body. The bypass line can be used in winter for heating the automatic pump if the usual heated hydraulic fluid is passed through the pump set.

Finally, all hydraulic connections on the automatic pump are brought together on one connection plate which can be joined pressure-tight to the connections of a connection plate on the machine side depending on the type of fluid plug connectors.

In the following, the invention based on various embodiments of the invention is explained in more detail using examples with reference to the drawings.

DETAILED DESCRIPTION

First, the structure of an automatic lubricating pump designed according to the invention will be explained based on the embodiment in FIG. 1.

The automatic lubricating pump 1 is formed with its connection lines P, R on a hydraulic circuit 2 of a construction machine (not illustrated) for connection, for example, via connections 3a and 3b formed as quick-fitting couplings. Connection 3a here represents the connection to the pressure line, similarly designated with P in FIG. 1, of the hydraulic circuit on the construction-machine side; connection 3b represents the connection to the essentially unpressurised return line, also designated with R in FIG. 1, of the hydraulic circuit.

Figure 1:
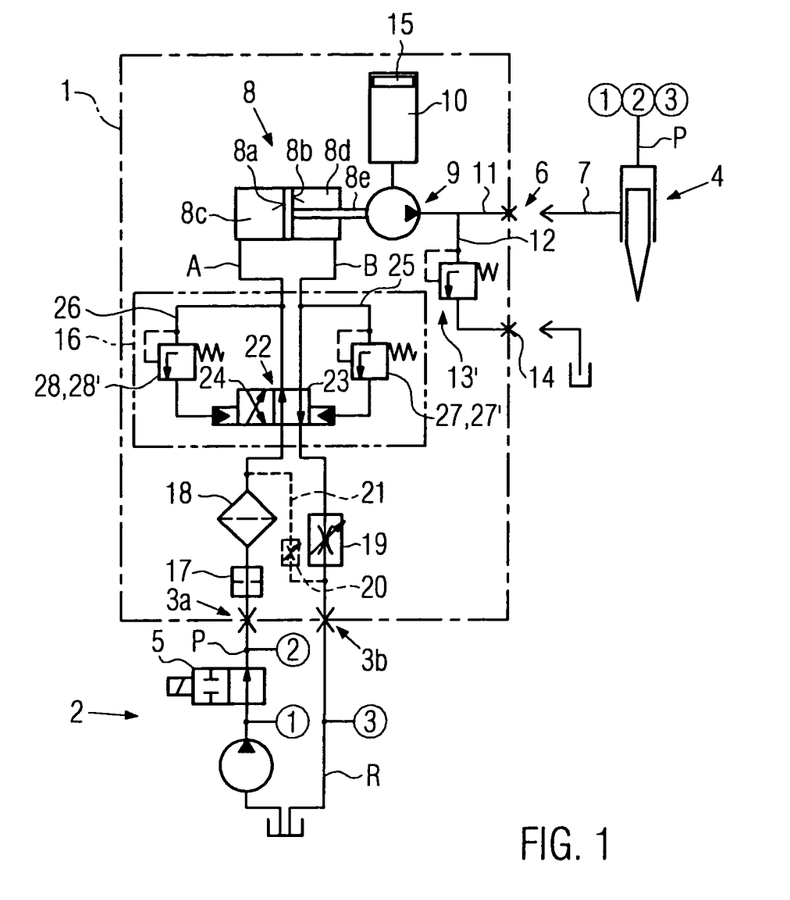
FIG. 1 a fluid flow chart of a first embodiment of an automatic lubricating pump according to the invention in particular for striking tools.

If the construction machine is equipped with, for example, a hydraulic striking tool 4, such as a hydraulic hammer, then pressure is applied to the pressure line P either constantly or, as illustrated in FIG. 1, periodically via a periodically actuated shuttle valve 5, in order to periodically drive the striking tool 4 appropriately. The striking tool 4 can alternatively be connected at various points to the hydraulic circuit 2, as schematically illustrated in FIG. 1 using the reference numerals 1, 2 and 3. Furthermore, the shuttle valve 5 can also be arranged in the return line R.

The automatic lubricating pump 1 is furthermore equipped with a lubricant outlet 6 to which a lubricant line 7 leading to a lubricating point can be connected. In particular the striking tool 4 can be regarded as a lubricating point.

The automatic lubricating pump 1 is fitted with a double-acting drive piston 8 which provides the drive for the feed pump 9. On both of its sides the drive piston 8 has drive surfaces 8a, 8b which are bordered in each case by the drive chambers 8c, 8d. The feed pump 9 conveys lubricant from a reserve of lubricant 10 through a discharge line 11 to the lubricant outlet 6. A branch 12 from the discharge line 11 can be equipped with a pressure relief valve 13, which leads to another connection 14, through which lubricant can be tapped off when a certain lubrication pressure in the discharge line 11 is exceeded.

The reserve of lubricant can be provided with a follower piston 15 to avoid drawing air through the feed pump 9.

The automatic lubricating pump 1 is furthermore provided with a hydraulically operable changeover member 16, through which two switching lines A, B leading to the drive chambers 8c and 8d of the double-acting drive piston 8 are alternately connected to the connection 3a or to the connecting line or pressure line P or to the connection 3b or to the connecting or return line R. To achieve this, the switching lines A, B are connected via the changeover member 16 to the pressure line P and the return line R of the hydraulic circuit 2 when the automatic lubricating pump 1 is connected to the hydraulic circuit 2.

An orifice 17 for limiting the volume flow of hydraulic liquid flowing through the changeover member and a filter unit 18 are fitted in the pressure line P between the changeover member 16 and the connection 3a. An adjustable throttle 19 is arranged in the return line R and alternatively also in the pressure line P after the filter unit 18. Additionally to or instead of the throttle 19, a throttle 20 can also be arranged between the connection lines in a bypass line 21 in parallel with the changeover member 16. The bypass line 21 preferably passes through a massively formed pump body and can be used for preheating the automatic lubricating pump 1. For this use a simple switching valve can also be employed instead of the throttle 20.

FIG. 1 shows that the changeover member 16 is formed for actuation without an external energy feed and only by the hydraulic circuit 2. For example, the changeover member 16 has a hydraulically actuated changeover valve 22, which as shown in FIG. 1, can be formed as a hydraulically actuated multiple way valve, in particular as a 4/2 valve. In a first operating position 23 the changeover valve connects the switching line A to the pressure line P and the switching line B to the return line R so that the drive chamber 8c is subjected to the hydraulic pressure in the hydraulic circuit 2 and the drive piston 8 moves in the direction of the other drive chamber 8d. In a second operating position 24 the switching line A is connected to the return line R and the switching line B to the pressure line P. In the second operating position with the automatic lubricating pump 1 connected to the hydraulic circuit 2, the drive chamber 8d is subjected to the hydraulic pressure in the hydraulic circuit 2 and the drive piston 8 moves in the direction of the drive chamber 8c.

The changeover valve 22 is actuated by the pressure in two control lines 25, 26 which are routed back parallel to the switching lines A, B from them in each case to the changeover valve 22.

In the control line 25 a pressure relief valve 27' is arranged as the switching means 27 and in the control line 26 a pressure relief valve 28' is also arranged as switching means 28. The switching means 27, 28 ensure that a changeover of the operating position 22, 23 occurs in the changeover valve 22 when a predetermined minimum pressure is exceeded in one of the respective control lines 25, 26. Since the switching lines A, B on connection to the pressure line P are either subjected to the hydraulic pressure or, on connection to the return line R, essentially unpressurised, the switching means 27, 28 only cause a changeover of operating position when the periodically changing hydraulic pressure P has exceeded the predetermined minimum switching pressure of the pressure relief valves.

This structure of the changeover member 16 produces the following functions:

Starting from the first operating position 23 in FIG. 1, the pressure builds up, for example, after an appropriate changeover of the shuttle valve 5 in the pressure line P, until the predetermined minimum switching pressure is exceeded in the switching line A connected in this operating position to the pressure line P. Then the pressure relief valve 28' opens, the control line 26 is subjected to the hydraulic pressure and the changeover valve 22 changes over into the second operating position 24. In the second operating position the switching line B is connected to the pressure line P and the switching line A to the return line R. If now the hydraulic pressure in the switching line B builds up at the next changeover of the switching valve 5, the pressure relief valve 27' opens, the control line 25 is subjected to the hydraulic pressure and the switching valve 22 switches back again into the first operating position 23, as shown in FIG. 1. In this way alternately, at one time the switching line A is connected to the pressure line P and the return line R and then at another time the pressure line B is connected to the return line R and the pressure line P. As a consequence of this continuous switching, the double-acting drive piston 8 moves to and fro and drives the feed pump 9 via the piston rod 8e.

The above embodiment functions in the described manner also when a constant hydraulic pressure prevails in the pressure line P and the switching valve 5 is omitted. In this case the movements of the actuating pistons lead to alternating pressure conditions and thus to the opening and closing of the pressure relief valve 27'.

Figure 2:
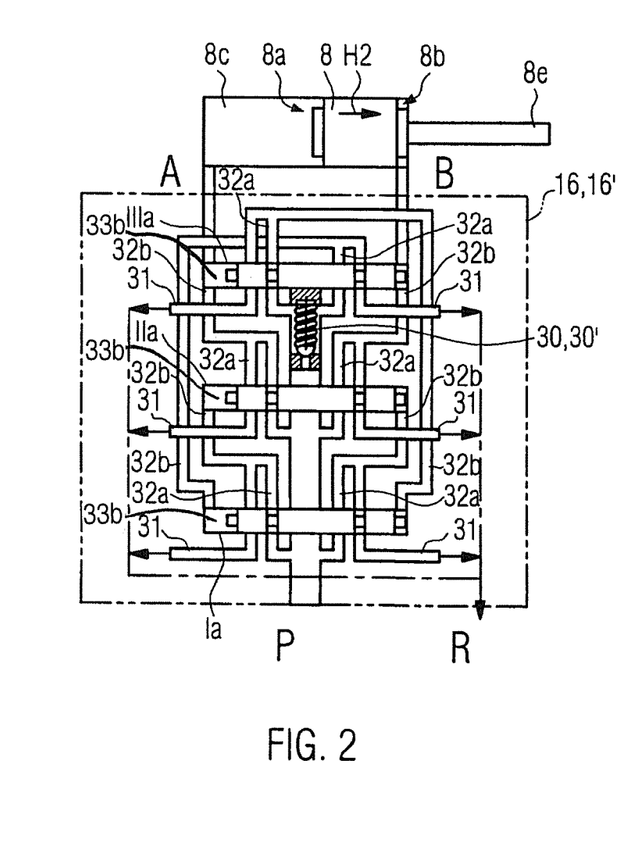
FIG. 2 a schematic sectional illustration of parts of a further embodiment of the same lubricating pump according to the invention in a first operating position.
Figure 3:
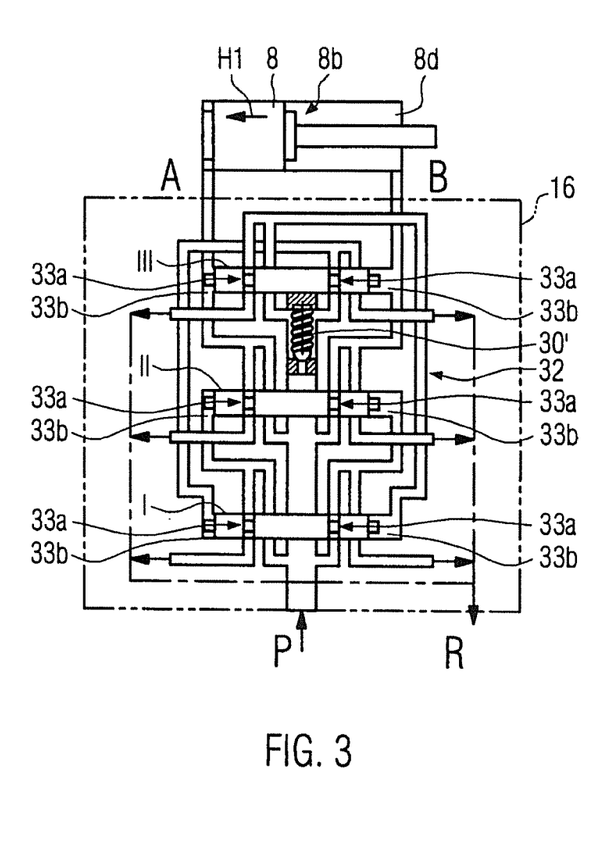
FIG. 3 the embodiment of FIG. 2 in a second operating position.

FIGS. 2 and 3 show a schematic sectional illustration of a further embodiment of the changeover member 16 in a schematic sectional illustration. The same reference numerals are used as in FIG. 1. In FIG. 2 the changeover member 16 is located in the first operating position in which the switching line A and the drive chamber 8c are connected to the pressure line P and the switching line B and the drive chamber 8d are connected to the return line R. FIG. 3 shows the embodiment of FIG. 2 in the second operating position in which the switching line B is connected to the pressure line P and the switching line A to the return line R. The changeover member 16 of FIGS. 2 and 3 can be used instead of the changeover member illustrated in FIG. 1.

In the embodiment of FIGS. 2 and 3 the changeover member 16 is formed as a progressive metering valve with three control pistons I, II and III as well as a switching means 30 formed as a pressure relief valve 30', which corresponds in its function to the switching means 27, 28 of the embodiment in FIG. 1. Apart from the two outputs of the changeover member 16, which are connected to the switching lines A and B, all outlets 31 of the changeover member 16 are connected to the return line R.

At least two pairs of control lines 32 and at least one pair of outlets 31 are assigned to each control piston I, II, III. Here, the first sections 32a of a first pair of control lines 32 are routed through the cylinders Ia, IIa, IIIa accommodating the respective control pistons I, II, III and can be opened and closed by at least two piston sections 33a of the respective control piston. The first sections 32a open out in each case at one end in the pressure line P and at their other end pass into the second sections 32b of the control lines. The second sections 32b open out in each case at the face sides of the control pistons I, II, III in the drive chambers 33b arranged there. Consequently, each control line 32 connects one drive chamber 33b of a control piston I, II, III to the pressure line P via a piston section 33a of another control piston.

In the embodiment of FIGS. 2 and 3 the control lines are arranged as follows:

The control lines 32 opening out into the drive chambers 33b of the control piston II are connected via the control piston I to the pressure line P (FIG. 2). The control lines opening out into the drive chambers 33b of the control piston III are routed via the piston sections 33a of the control piston II. The control lines opening out into the drive chambers 33b of the control piston I are routed via the piston sections 33a of the control piston II. Apart from the control lines routed from control piston I via control piston III, the control lines 32 are in each case located on one side of the symmetrically formed control pistons.

The outlets 31 also run via the piston sections 33a parallel to the first sections 32a of the control lines 32 and open out like these in the second section 32b of the control lines. The piston sections 33a are in each case dimensioned here such that they either simultaneously both close the outlet 31 assigned to them and also the first section 32a also assigned to them or only one of them.

Since in each case one pair of control lines 32 passes to the drive chambers 33b on the face sides of the assigned control piston I, II, III, each control piston is displaced into one of its two end positions, as soon as a control line 32 of this pair is connected to the pressure line P and the other control line 32 of this pair is connected to the return line R.

In the end positions of the control piston an outlet is in each case opened and simultaneously the section 32a of a control line in parallel to this outlet is closed by one piston section 33a so that the second section 32b of this control line is connected to the return line R. In addition, the first section 32a of the other control line passing through the control piston is opened, while simultaneously the outlet 31, which is parallel on this section 32a, is closed by the other piston section 33a so that the opened control line is connected to the pressure line P. Thus, each control piston I, II, III has a first operating position and a second operating position which correspond to both of its end positions in the cylinder Ia, IIa, IIIa. In the first operating position one drive chamber of the control piston connected via the control line 32 is subjected to the hydraulic pressure and the other drive chamber is connected to the return line R via the outlet 31. In the second operating position the other drive chamber of this control piston is subjected to the hydraulic pressure and the other drive chamber is connected to the return line R. Correspondingly, in switching to and fro between the drive chambers of a control piston connected to the control lines, connection is made to the pressure line P alternately in the two operating positions.

The pressure relief valve 30 is positioned in front of the two control lines 32 through the control piston III and formed such that it only opens when a predetermined hydraulic pressure in the pressure line P is exceeded and, depending on the position of the control piston III, connects one of the drive chambers 33a of the control piston I to the pressure line P.

The function of the changeover member 16 of FIGS. 2 and 3 is as follows:

In FIG. 2 the switching line A of the drive piston 8 is connected via the drive chambers 33b of the control piston III and the control piston II to the pressure line P. The drive piston 8 is accordingly moved into the right end position in FIG. 2, because the drive chamber 8c is subjected to hydraulic pressure. The movement of the drive piston 8 is transferred to the feed pump 9 (not shown in FIGS. 2 and 3) via the piston rod 8e. The operating position of FIG. 2 thus corresponds to the operating position 23 of FIG. 1.

If the pressure line P is subjected to pressure by the hydraulic valve 5 (FIG. 1) switching over, the pressure in the pressure line P increases until the predetermined minimum switching pressure of the pressure relief valve 30 is reached and it opens. With the pressure relief valve 30 open the left control line 32 of the control piston III in FIG. 2 is connected to the right drive chamber 33b of the control piston I in FIG. 2. The control piston I is subjected on its right face side to the hydraulic pressure in the pressure line P and moves into its left end position in which it connects the right control line 32 to the right drive chamber 33b of the control piston II, while it simultaneously connects the left drive chamber 33b of the control piston II to the return line R via an outlet 31. Consequently, the control piston II moves from the right end position illustrated in FIG. 2 into the left end position as soon as the control piston I is also moved into the left end position.

In the left end position the control piston II in turn connects the right control line 32 to the right drive chamber 33b of the control piston III and thus the switching line B to the pressure line P. Simultaneously, the control piston II closes the left control line 32 and connects the left drive chamber 33b of the control piston III and thus the switching line A to the outlet 31 assigned to it. Thus the drive piston 8 can move from one end position on the right to the other end position on the left.

At the end of this changeover process all control pistons I, II, II and the drive piston 8 are moved into their left end position, as illustrated in FIG. 3. This operating position corresponds to the operating position 24 in FIG. 1. The to-and-fro movement of the drive piston is indicated symbolically in FIGS. 2 and 3 by the arrows H1 and H2.

If, during the next switching cycle of the switching valve 5, the pressure again increases in the pressure line P beyond the minimum switching pressure, then the pressure relief valve 30 opens again and the control pistons I, II, III move in this order successively from their left end position illustrated in FIG. 3 into the right end position illustrated in FIG. 2 until the drive chamber 8c is connected to the pressure line P and the drive piston 8 has also moved in the direction H2 into its right end position. With that, one changeover process and one drive cycle of the double-acting drive piston 8 have finished.

Figure 4:
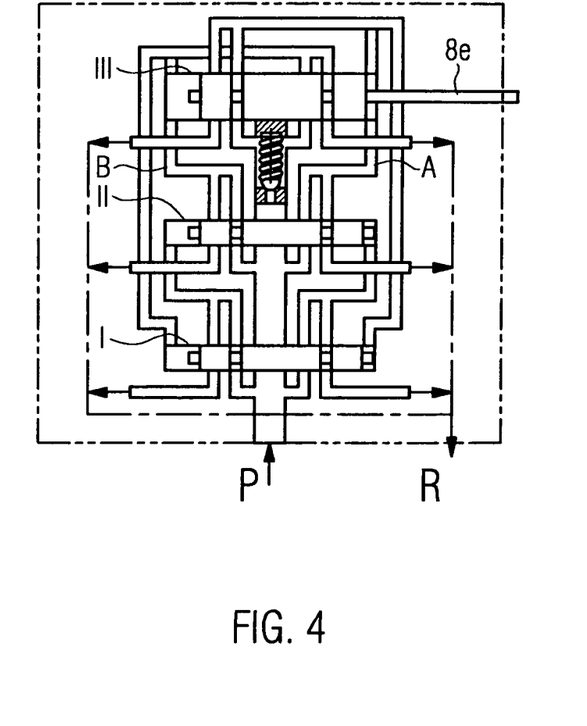
FIG. 4 a schematic sectional illustration of parts of a further embodiment of the automatic lubricating pump according to the invention.

FIG. 4 shows in a schematic sectional illustration a further embodiment of the changeover member 16. With this embodiment the same reference numerals are used as for the aforementioned embodiments, provided the function and the structure of the elements are the same.

In contrast to the embodiment of FIGS. 2 and 3, in the embodiment of FIG. 4 the control piston III is also used as the drive piston, which drives the feed pump 9 (cf. FIG. 1) via the piston rod 8e. As illustrated in FIG. 4, the control piston III can be formed with a larger cross-section than the other control pistons in order to produce greater driving forces. One of the other control pistons can also be used as the drive piston instead of the control piston III.

Otherwise the function and structure of the embodiment of FIG. 4 correspond to the function and structure of the embodiment of FIGS. 2 and 3.

Figure 5:
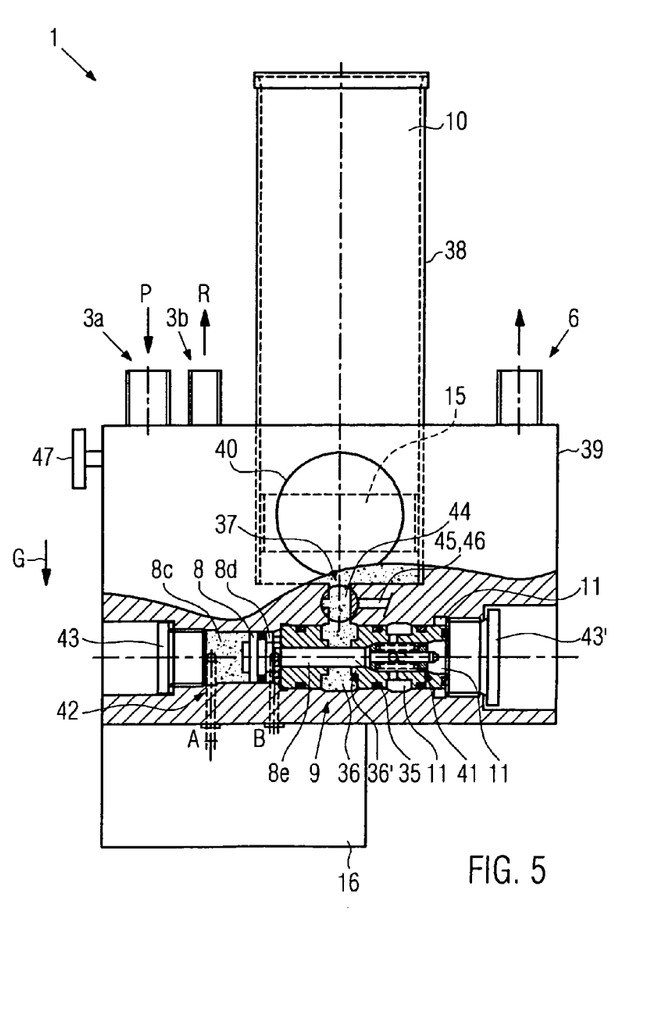
FIG. 5 a schematic side view with exposed sections of a further embodiment of the automatic lubricating pump according to the invention.

FIG. 5 shows a further embodiment of an automatic lubricating pump 1, wherein the same reference numerals are used as in the aforementioned figures provided they are similar in their structure or function.

The automatic lubricating pump 1 of FIG. 5 is equipped with a changeover member 16 which can be constructed according to one of the aforementioned embodiments.

The drive piston 8, the two chambers 8c, 8d of which are connected to the switching lines A, B of the changeover member 16, is connected in a motion-transmitting manner via the piston rod 8e to the single or double-acting feed piston 35 of the feed pump. As can be seen in FIG. 5, the feed piston 35 can be formed in particular as one piece by the piston rod 8e.

The feed pump 9 furthermore has a feed chamber 36 which is connected to the reserve of lubricant 10 via a suction line 37. The part 36' of the feed chamber 36, which is closely sealed to the feed piston and leads to the lubricant line 11, is used as the metering chamber, which determines the amount of lubricant delivered to the lubricating point per stroke of the feed piston 35. The reserve of lubricant 10 is accommodated in a repeatedly exchangeable cartridge 38 which is placed sealed on a pump housing 39.

The end position of the follower piston 15 with an empty or almost empty cartridge 38 can be read via an inspection window 40 in the cartridge 38 or in the pump housing 39.

The reserve of lubricant 10 is arranged in the direction G of the gravitational force above the feed chamber 36 so that the gravitational force supports the filling of the feed chamber 36 with lubricant from the reserve of lubricant. In addition, due to the to-and-fro movement of the double-acting drive piston 8, the feed piston 35 automatically draws lubricant from the reserve of lubricant 10. A reverse flow of lubricant out of the metering chamber 36' into the reserve of lubricant is eliminated, because the feed piston 35 plunges into the metering chamber 36' in a sealed manner.

The feed piston 35 presses the lubricant out of the metering chamber 36' through a non-return valve 41 in the direction of the lubricant outlet 6.

The drive piston 8 and the feed pump 9, preferably together with the non-return valve 41, are inserted into preferably a single hole 42 in the pump housing 39. The hole 42 has at least on one end, preferably as illustrated in FIG. 5 on both of its ends, screw plugs 43, which can be easily removed for servicing purposes and enable access to the drive piston 8 or the feed pump 9 with optionally the non-return valve 41.

Figure 6:
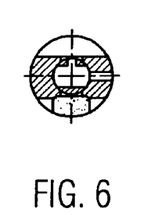
FIG. 6 a second operating position of an element of FIG. 5.

A three-way valve 44, for example in the form of a ball valve, is arranged in the suction line 37. The three-way valve 44 is formed for actuation outside of the automatic lubricating pump and, in the position illustrated in FIG. 5, connects the reserve of lubricant to the feed chamber 36. In the position illustrated in FIG. 6 the three-way valve 44 is formed for transfer in that the suction line 37 is connected to a filling line 45 so that if required, the cartridge 38 can be filled via a filling connection 46 which is externally accessible.

With a cartridge unintentionally emptied during feeding, there is the possibility of venting the suction channel 37 and filling with grease after changing the cartridge by exerting manual pressure on the usual follower plate and releasing the venting screw.

Finally, the automatic lubricating pump 1 has according to the embodiment of FIG. 5 an actuating element 47, with which the throttle 19, 20 (FIG. 1) can be actuated, the hydraulic flow changed and the amount of lubricant discharged per unit time by the automatic lubricating pump can be set.

The embodiments described above can be modified further. For example, the pressure relief valve can be omitted if at least one further control piston is used appropriate to control pistons I, II.

Furthermore, instead of the connections illustrated in FIG. 4, which can be connected singly to appropriate lines, a connection plate can be provided to which all fluid connections are brought together. This connection plate forms part of a fluid plug, with which the automatic lubricating pump can be connected to the machine in one step.

The invention claimed is:

1. A device comprising:
    an automatic lubricating pump designed for connection to a pressure line of a hydraulic circuit, the pressure line having a repeatedly rising and dropping hydraulic pressure or a constant hydraulic pressure to drive a machine, wherein the automatic lubricating pump comprises
        a drive piston shaped to be driven by the hydraulic circuit, and
        a feed piston connected to the drive piston in a motion-transmitting manner, said feed piston bordering on a lubricant feed chamber connected to at least one lubricant outlet of the automatic lubricating pump,
    wherein the drive piston is designed to be double-acting with two drive chambers, and
    the automatic lubricating pump comprises a changeover member configured to be engaged by the hydraulic circuit and operated by the hydraulic pressure of the pressure line to alternately connect the drive chambers to the pressure line.

2. The device according to claim 1, wherein the changeover member comprises at least one hydraulically operable changeover valve through which:
    in a first operating position, the one drive chamber is connected to the pressure line and the other drive chamber to a return line, and
    in a second operating position, one drive chamber is connected to the return line and the other drive chamber to the pressure line.

3. The device according to claim 2, wherein the changeover valve comprises at least one control line that can be connected to the pressure line, and wherein at least one pressure control valve is arranged in the control line.

4. The device according to claim 1, wherein the changeover member comprises a progressive feeder.

5. The device according to claim 4, wherein the progressive feeder comprises at least three control pistons.

6. The device according to claim 5, wherein a pressure control valve is connected between one pair of control lines of one of the control pistons and the pressure line.

7. The device according to claim 5, wherein the drive piston is formed from one of the control pistons of the progressive feeder.

8. The device according to claim 4, wherein two outlets of the progressive feeder are connected to the drive chambers of the drive piston and the other outlets are connected to the return line.

9. The device according to claim 1, wherein the drive piston and the feed piston are coupled together by a piston rod.

10. The device according to claim 1, wherein the automatic lubricating pump comprises an adjustable throttle configured to be engaged by the hydraulic circuit and provided in parallel or in series with the changeover member.

11. The device according claim 1, wherein a reserve of lubricant is accommodated in an exchangeable cartridge arranged on the automatic lubricating pump.

12. The device according to claim 11, wherein the cartridge comprises a closable filling line which is externally accessible.

13. The device according to claim 1, comprising a closable bypass line provided in parallel to the changeover member.

14. The device according to claim 1, wherein the connections of the automatic lubricating pump are collected on an adapter plate.

15. The device according to any one of the preceding claims, further comprising:
    a hydraulic striking tool for the machine, wherein the machine includes the hydraulic circuit that can be repeatedly subjected to the rising and dropping hydraulic pressure, wherein the lubricating pump is operable by the hydraulic circuit.

16. A method comprising lubricating at least one lubricating point on a machine comprising a hydraulic circuit, including moving a drive piston by a repeatedly rising and dropping hydraulic pressure or a constant hydraulic pressure in a pressure line of the hydraulic circuit and transferring the movement of the drive piston to a feed piston coupled to the drive piston, said piston feeding lubricant in the direction of the at least one lubricating point, wherein two drive chambers of the drive piston are alternately connected to the pressure line and the drive piston executes a to-and-fro movement.

17. The method according to claim 16, wherein the feed piston automatically draws lubricant from a reserve of lubricant.

18. The method according to claim 16, wherein the hydraulic pressure drives a changeover member which connects the pressure line of the hydraulic circuit alternately to one of the two drive chambers.

19. The method according to any one of claims 16 to 18, wherein the connection of the pressure line is switched from one drive chamber to the other when the hydraulic pressure exceeds a predetermined minimum switching pressure.

* * * * *